United States Patent
Colbert et al.

(10) Patent No.: US 9,377,963 B2
(45) Date of Patent: *Jun. 28, 2016

(54) ONLINE VIRTUAL MACHINE DISK MIGRATION

(71) Applicant: VMware, Inc., Palo Alto, CA (US)

(72) Inventors: Osten Kit Colbert, Mountain View, CA (US); Gregory Hutchins, San Francisco, CA (US); Robert Bosch, Sunnyvale, CA (US); Jairam Ranganathan, Los Angeles, CA (US); Joel Baxter, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/242,928

(22) Filed: Apr. 2, 2014

(65) Prior Publication Data

US 2014/0229697 A1    Aug. 14, 2014

Related U.S. Application Data

(63) Continuation of application No. 13/546,096, filed on Jul. 11, 2012, now Pat. No. 8,706,991, which is a continuation of application No. 12/184,134, filed on Jul. 31, 2008, now Pat. No. 8,239,646.

(60) Provisional application No. 60/962,946, filed on Jul. 31, 2007.

(51) Int. Cl.
*G06F 3/06* (2006.01)
*G06F 11/14* (2006.01)

(52) U.S. Cl.
CPC .............. *G06F 3/0647* (2013.01); *G06F 3/067* (2013.01); *G06F 3/0617* (2013.01); *G06F 3/0619* (2013.01); *G06F 3/0664* (2013.01); *G06F 3/0689* (2013.01); *G06F 11/1471* (2013.01); *G06F 2201/84* (2013.01)

(58) Field of Classification Search
None
See application file for complete search history.

(56) References Cited

U.S. PATENT DOCUMENTS

| 7,085,883 | B1 * | 8/2006 | Dalgic ................ G06F 3/0617 711/114 |
| 7,185,032 | B2 | 2/2007 | Rudoff |
| 7,376,805 | B2 | 5/2008 | Stroberger et al. |
| 7,484,208 | B1 | 1/2009 | Nelson |
| 7,533,229 | B1 | 5/2009 | van Rietschote |

(Continued)

OTHER PUBLICATIONS

Constantine P. Sapuntzakis et al., "Optimizing the Migration of Virtual Computers," USENIX, Proceedings of the 5th Symposium on Operating Systems Design and Implementation, Boston, Massachusetts, USA, Dec. 2002, 14 pages.

(Continued)

*Primary Examiner* — Yaima Rigol

(57) ABSTRACT

A method for migrating a virtual machine disk (VM disk) from first physical storage to second physical storage while the virtual machine (VM) is running, the method comprising: (a) creating a first child VM disk to which writes are redirected from a first parent VM disk, the first parent VM disk being on the first physical storage; (b) copying the first parent VM disk to the second physical storage as a second parent VM disk; (c) re-parenting the first VM child disk to the second parent VM disk; and (d) consolidating the first child VM disk and the second parent VM disk.

19 Claims, 6 Drawing Sheets

(56) References Cited

U.S. PATENT DOCUMENTS

| | | | |
|---|---|---|---|
| 7,536,525 | B2 | 5/2009 | Chandrasekaran et al. |
| 7,606,868 | B1 * | 10/2009 | Le .................. G06F 17/30067 707/999.01 |
| 7,624,260 | B2 | 11/2009 | Ethier et al. |
| 7,761,573 | B2 | 7/2010 | Travostino et al. |
| 7,900,005 | B2 | 3/2011 | Kotsovinos et al. |
| 7,966,614 | B2 | 6/2011 | Chodroff et al. |
| 7,984,262 | B2 | 7/2011 | Battista et al. |
| 8,239,646 | B2 | 8/2012 | Colbert et al. |
| 2003/0188229 | A1 | 10/2003 | Lubbers et al. |
| 2004/0010787 | A1 | 1/2004 | Traut et al. |
| 2005/0262181 | A1 | 11/2005 | Schmidt et al. |
| 2006/0005189 | A1 | 1/2006 | Vega et al. |
| 2006/0010176 | A1 | 1/2006 | Armington |
| 2006/0089995 | A1 | 4/2006 | Kerr et al. |
| 2006/0155735 | A1 | 7/2006 | Traut et al. |
| 2006/0161752 | A1 * | 7/2006 | Burkey .................. G06F 3/0605 711/170 |
| 2006/0218544 | A1 | 9/2006 | Chakraborty et al. |
| 2007/0220121 | A1 | 9/2007 | Suwarna |
| 2007/0239944 | A1 * | 10/2007 | Rupanagunta ........ G06F 3/0613 711/147 |
| 2007/0260831 | A1 | 11/2007 | Michael et al. |
| 2007/0283347 | A1 | 12/2007 | Bobroff et al. |
| 2009/0037680 | A1 | 2/2009 | Colbert et al. |
| 2009/0265706 | A1 | 10/2009 | Golosovker et al. |

OTHER PUBLICATIONS

Michael Nelson et al., "Fast Transparent Migration for Virtual Machines," 2005 USENIX Annual Technical Conference, Palo Alto, California, USA, pp. 391-394, 2005.

Dejan S. Milojicic et al., "Process Migration," ACM Computing Surveys, vol. 32, No. 3, pp. 241-299, Sep. 2000.

PowerConvert, http://www.platespin.com/products/powerconvert (retrieved from https://www.netiq.com/products/migrate/?r=platespin).

VMware vCenter Converter, VMware, Inc., Copyright © 2009, 2 pages, http://vmware.com/files/pdf/converter_datasheet.pdf.

"Shadowsurfer", StorageCraft™—Security Solutions, StorageCraft Technology Corporation © 2004-2005, 2 pages, http://www.storagecraft.com/documents/SecurityDataSheet.pdf.

"Volume Snapshot Manager", StorageCraft™—Manage Solutions, StorageCraft Technology Corporation © 2004-2006, 2 pages, http://www.storagecraft.com/documents/VSMdsheet.pdf.

Migrate Easy, http://www.acronis.com/homecomputing/products/migrateeasy/ (retrieved from http://www.acronis.com/en-us/personal/migration-software, © 2002-2014 Acronis International GmbH).

True Image, http://www.acronis.com/homecomputing/products/trueimage/ (retrieved from http://acronis.com/en-us/personal/pc-backup/, © 2002-2014 Acronis International GmbH).

* cited by examiner

ONLINE VIRTUAL MACHINE DISK MIGRATION

CROSS REFERENCE TO RELATED APPLICATIONS

This application claims priority from and is a continuation of U.S. patent application Ser. No. 13/546,096, filed on Jul. 11, 2012, which claimed priority from and is a continuation of U.S. patent application Ser. No. 12/184,134, filed Jul. 31, 2008, which issued as U.S. Pat. No. 8,239,646 and which claimed priority from U.S. Provisional Application No. 60/962,946, filed Jul. 31, 2007.

FIELD

One or more embodiments of the present invention relate to migration of virtual machine disks.

BACKGROUND

In the field of computer science, a virtual machine (VM) is an abstraction—a virtualization—of an actual physical computer system. A virtual machine or guest is installed on a host platform, or simply host, which includes system hardware and one or more layers or co-resident components comprising system-level software, such as an operating system or similar kernel, or a virtual machine monitor or hypervisor, or some combination of these. Each VM will typically have both virtual system hardware and guest system software.

The state of a virtual machine can be encapsulated as a file or a set of files that is stored on a storage device or on a set of storage devices accessible by the host. The storage can be local or it can be a shared storage device in a centralized location, such as a storage area network (SAN) or a network attached storage (NAS).

A VM's virtual hardware typically includes at least one virtual disk—a virtual disk is a file or set of files that appears as a physical disk drive to a guest operating system. A virtual disk may be represented as a file or a set of files on a physical storage device. It may be necessary at times to perform maintenance on the storage device. Typically, to perform the maintenance, the storage device is powered down. Virtual machines whose virtual disks are stored as a file or a set of files on the storage device will therefore be unavailable for the duration of the maintenance.

One solution to this problem is to "cold" migrate the virtual machine disks to another storage device. However, the virtual machines still have to be powered down for at least the amount of time it takes to migrate the disks, which may be significant.

Another solution to this problem involves the use of storage replication technologies that generally provide block level replication of a storage device. Storage replication, also known as storage mirroring, allows virtual machines to switch transparently between primary and backup storage devices, without downtime if a proxy or redirector is used. However, the proxy or redirector is a single point of failure, and the replication must be configured in advance. Also, replication can be expensive and may not be suitable for all VMs.

SUMMARY

A method for migrating a virtual machine disk (VM disk) from first physical storage to second physical storage while the virtual machine (VM) is running, the method comprising: (a) creating a first child VM disk to which writes are redirected from a first parent VM disk, the first parent VM disk being on the first physical storage; (b) copying the first parent VM disk to the second physical storage as a second parent VM disk; (c) re-parenting the first VM child disk to the second parent VM disk; and (d) consolidating the first child VM disk and the second parent VM disk.

DETAILED DESCRIPTION

It should be appreciated that one or more embodiments of the present invention can be used with hosted and/or non-hosted virtualized computer systems in which virtual machine(s) (VMs) may be fully or para-virtualized systems (regardless of the degree of virtualization), and in which the VMs have any number of physical and/or logical virtualized processors which may be of any type (including multi-cored, multi-threaded, or some combination). The Appendix discusses virtualization technology. Moreover, one or more embodiments of the present invention may be implemented wholly or partially in hardware, for example and without limitation, in processor architectures intended to provide hardware support for VMs. In addition, one or more embodiments of the present invention may also be implemented directly in a computer's primary OS, both where the OS is designed to support virtual machines and where it is not.

In accordance with one or more embodiments of the present invention, a virtualized computer system implements an online VM disk migration functionality which allows VM disks to be relocated to different physical storage devices while the VM is running. The online VM disk migration functionality, which is described below in more detail, may be implemented by virtualization software or a virtualization layer of the virtualized computer system.

Figure 3:
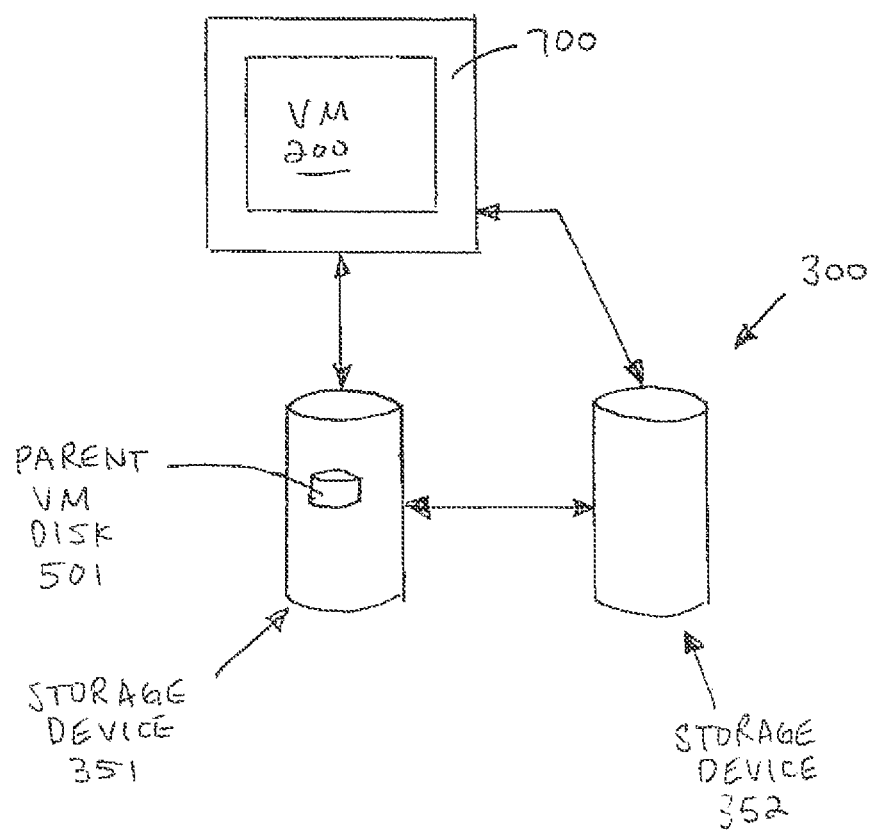
FIG. 3 is a block diagram illustrating selected elements of a system for storing virtual machine disks according to one embodiment of the present invention.

FIG. 3 is a block diagram illustrating selected elements of storage system 300 for storing virtual machine disks according to one embodiment of the present invention. As shown in FIG. 3, storage system 300 includes first shared physical storage device 351 and second shared physical storage device 352, and virtualized computer system 700 that includes virtual machine 200 (VM 200) installed on virtualized computer system 700. As further shown in FIG. 3, virtualized computer system 700 is coupled to storage system 300 in some manner. More specifically, storage system 300 may be part of a storage area network (SAN) or a network attached storage (NAS). In either of these cases, virtualized computer system 700 may be connected to storage system 300 via a network (for example and without limitation, the Internet and/or an intranet). Alternatively, storage system 300 may be implemented as part of virtualized computer system 700—that is, generally speaking, storage devices 351 and 352 may reside within the same computer system (which may be virtualized computer system 700 that hosts VM 200), or it may be implemented on separate devices. Storage system 300 may provide storage for more than one virtualized computer system, each of which virtualized computer systems may implement multiple virtual machines. In a sense, storage device 351 supplements or replaces mass storage disk 140 of FIG. 1. It should be understood that system architectures other than those just described may also be employed.

With reference to FIG. 3, storage device 351 stores VM disk 501 for VM 200. In accordance with one or more embodiments of the present invention, VM disk 501 is a file on storage device 351 that represents virtual disk 240 (refer to FIGS. 1 and 2), and as such, VM disk 501 is an embodiment of virtual disk 240 that is managed by a virtualization layer (also referred to herein as virtualization software) of virtualized computer system 700. In accordance with one or more embodiments of the present invention, virtual disk 240 may be represented as a flat file in VM disk 501; however, it may instead be multiple files or a "raw device mapping" (RDM, which is described further below). In general, virtual disk 240 is what VM 200 "sees" while VM disk 501 is what exists on the real file system, and is what the virtualization layer of virtualized computer 700 manipulates.

The following discussion pertains to the migration of VM disk 501 from storage device 351 to storage device 352. However, also presented herein are embodiments where the techniques described herein can be useful for more than migration of VM disks. Also, while the examples below refer to a single VM disk (i.e., VM disk 501), embodiments of the present invention are not so limited. Thus, there may be more than one—in fact, many—such disks associated with a VM, and each of them can be migrated with the VM running as described herein.

With reference to FIG. 3, VM disk 501 can be represented in a variety of ways by virtualization software. For example, in one embodiment, VM disk 501 may be represented using a file or files, and in another embodiment, VM disk 501 is represented using an RDM. When using the file method, VM disk 501 is represented by one or more files that reside on a storage device that is accessible by VM 200 (e.g., storage device 351). The virtualization layer sets up a mapping between blocks of virtual disk 240 and byte ranges of the file or files of VM disk 501 that represent virtual disk 240. Reads or writes to a sector of virtual disk 240 come from the corresponding byte ranges of the file or files of VM disk 501 that represent virtual disk 240. Raw device mappings represent virtual disk 240 by mapping it to a physical partition of VM disk 501 that is accessible to the virtualization software. Each block of virtual disk 240 is mapped to a block on that physical partition of VM disk 501. This mapping is generally an identity mapping. As with the file approach described above, reads or writes to a sector on virtual disk 240 come from the corresponding sector of the RDM of VM disk 501.

Figure 4:
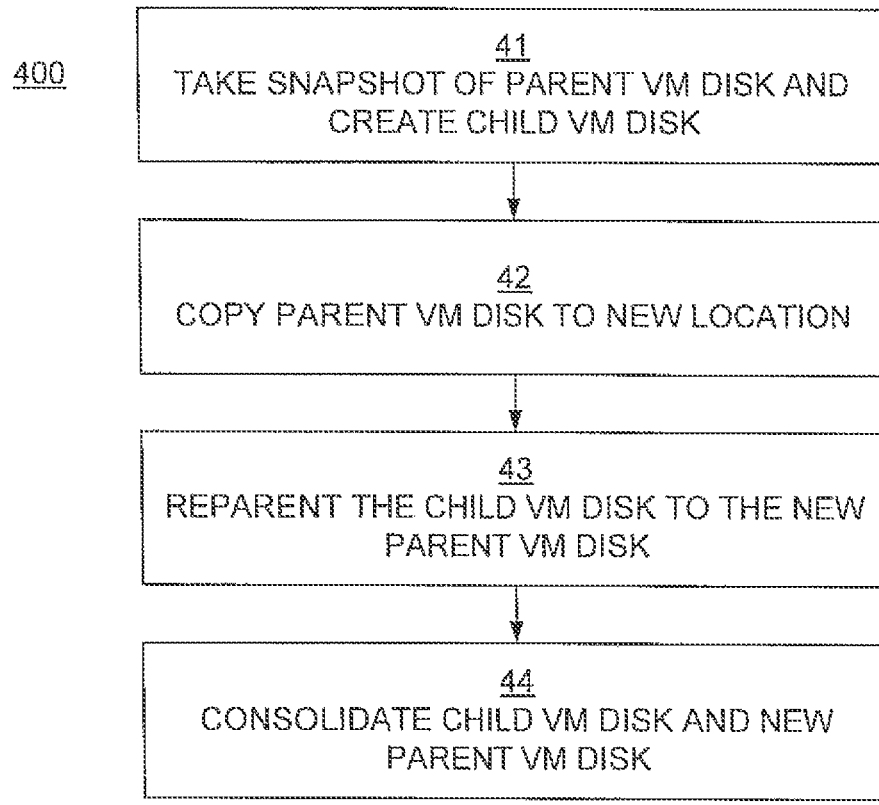
FIG. 4 is a flowchart of a method for relocating a virtual machine disk in accordance with one or more embodiments of the present invention.

FIG. 4 is a flowchart 400 of one embodiment of a method, referred to herein as online VM disk migration, which may be used to relocate a VM disk (e.g., VM disk 501 of FIG. 3) from a first physical storage device (for example, storage device 351 of FIG. 3) to a second physical storage device (for example, storage device 352 of FIG. 3) while the VM is running, transparently to the VM, and with little (if any) downtime. Although specific steps are disclosed in flowchart 400, such steps are exemplary. For example, steps 43 and 44 may be combined. Further, in accordance with one or more embodiments, the method of flowchart 400 may be implemented as computer-executable instructions stored on a computer-readable medium.

Figure 5A:
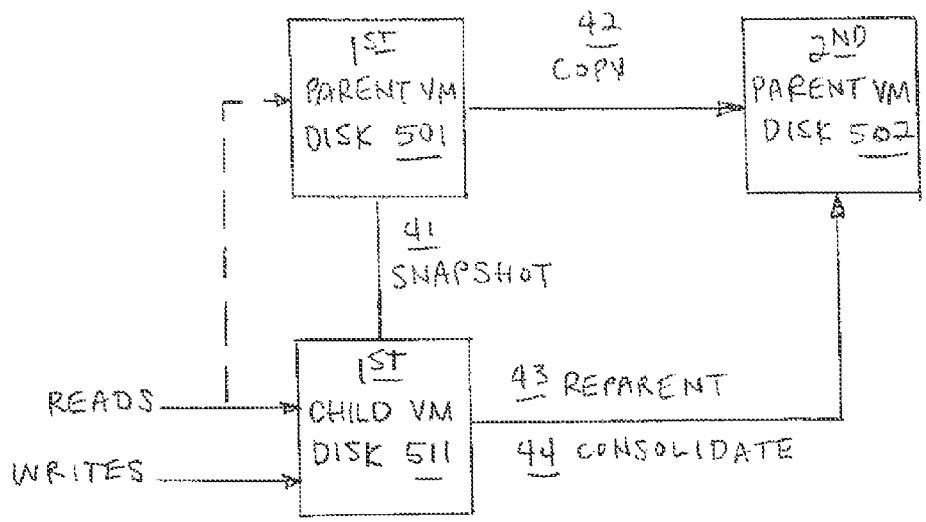
FIGS. 5A and 5B help illustrate online virtual machine disk migration methods in accordance with one or more embodiments of the present invention.

Flowchart 400 of FIG. 4 is described in conjunction with FIG. 5A. As shown in FIG. 4, at step 41, a snapshot of the contents of first parent VM disk 501 is taken—the state of VM disk 501 is saved at the instant the snapshot is taken so that VM disk 501 can be reverted back to the state captured by the snapshot at any future point in time. In one embodiment, in addition to the snapshot taken of VM disk 501, snapshots of the contents of other elements of virtualized computer system 700, or VM 200, may be taken. An example of snapshotting is described in U.S. Pat. No. 6,795,966 (Lim et al., "Mechanism for Restoring, Porting, Replicating and Checkpointing Computer Systems Using State Extraction," 21 Sep. 2004). However, embodiments of the present invention are not limited to this example; different types of snapshot techniques, or techniques that are similar in purpose or result to snapshotting, may be used.

As part of the snapshot operation, child VM disk 511 is created. In accordance with one or more embodiments, child VM disk 511 may be stored on storage device 351 or storage device 352 and it initially starts out empty but, as will be seen, it serves to capture changes (for example, writes) that ordinarily would be directed to VM disk 501. In accordance with one or more further embodiments, child VM disk 511 may instead be a redo log. A redo log, in general, records changes to data in a database. An example of a redo log in a virtualization system is described in U.S. Pat. No. 7,155,558 (Vaghani et al., "Providing Access to a Raw Data Storage Unit in a Computer System," 26 Dec. 2006); however, embodiments of the present invention are not limited to this example.

Further, in accordance with one or more such embodiments, child VM disk 511 can be located on any of the storage devices in storage system 300—it can reside on storage device 351 (its source location), on storage device 352 (its eventual destination), or on another storage device.

In one embodiment, after child VM disk 511 is created, parent VM disk 501 is made read-only. In accordance with such an embodiment, after creation of child VM disk 511, all writes intended for parent VM disk 501 are redirected to child VM disk 511. Thus, the contents of parent VM disk 501 may remain static and continue to represent the state of VM disk 501 at the time the snapshot was taken; thus, changes that would ordinarily be made to VM disk 501 are instead captured by child VM disk 511. In accordance with one such embodiment, reads are first directed to child VM disk 511; then, if the information sought by a read is not available in child VM disk 511, the read is redirected to parent VM disk 501. The act of first checking child VM disk 511 before moving on to parent VM disk 501 has only a small impact on VM performance—not all reads will have to be redirected to the parent, and the overhead associated with redirected reads is small.

The snapshot and VM disk 501 should be consistent in content. In essence, this means that any pending writes to VM disk 501 should be held up while the snapshot is taken. In accordance with one such embodiment, this is accomplished by "stunning" VM 200 just before the snapshot is taken to quiesce all active input/output (I/O) operations, interrupts, etc., and to create a safe state from which to snapshot VM disk 501. A stun operation can be performed quickly; there is typically little VM downtime associated with a stun operation (generally, it is less than a tenth of a second).

In accordance with one or more embodiments of the present invention, pending writes are either completed before VM 200 is stunned or afterward. Thus, writes are completed in full either to parent VM disk 501 or to child VM disk 511—writes are not partially written to one of the VM disks and partially to the other. In accordance with one or more further embodiments, consistency of the snapshot and VM disk 501 can be maintained without stunning VM 200 by implementing controls that ensure that writes are directed correctly and entirely to either VM disk 501 or child VM disk 511.

In accordance with one or more embodiments of the present invention, child VM disk 511 can be represented as a file or as an RDM, regardless of whether parent VM disk 501 is represented as a file or as an RDM. A file representation may be advantageous because it can: (a) be placed on virtually any file system accessible to VM 200; (b) be allocated on the fly; and (c) start with zero size and then be grown as each write is committed to child VM disk 511. The discussion below presumes the use of a file; however, an RDM works just as well.

At step 42 of FIG. 4, first parent VM disk 501 is copied to second storage device 352—the copy may be referred to herein as second parent VM disk 502. The contents of first parent VM disk 501 and second parent VM disk 502 are the same in terms of the information stored; however, the layout or structure of second storage device 352, or the file system used by the second storage device, may be different from that of first storage device 351. For example, one storage device may store the information as a sparse disk file or as a fully pre-allocated disk file or as an RDM, while the other storage device may store the information differently. Thus, for example, first parent VM disk 501 may be represented as a file, and second parent VM disk 502 as an RDM, or vice versa.

At step 43 of FIG. 4, child VM disk 511 is "re-parented" to second parent VM disk 502. That is, child VM disk 511 is disassociated from first parent VM disk 501, and associated with (i.e., linked or pointed to) second parent VM disk 502. Various techniques that are well known to those of ordinary skill in the art can be used to perform the re-parenting. For example, re-parenting can be accomplished by stunning VM 200, although it can also be accomplished without stunning VM 200, depending on how VM 200 is implemented.

In accordance with one or more embodiments, second parent VM disk 502 is made read-only so that writes continue to be redirected to the child VM disk 511. In accordance with one or more such embodiments, reads are directed first to child VM disk 511 and then to second parent VM disk 502 if the information sought by the read is not available at child VM disk 511.

At step 44 of FIG. 4, child VM disk 511 is consolidated with second parent VM disk 502. Specifically, changes written to child VM disk 511 are incorporated into second parent VM disk 502. Various techniques that are well known to those of ordinary skill in the art can be used to perform the consolidation.

Thus, VM disk 502 becomes the virtual disk of VM 200 as if the operations of steps 41, 42 and 43 had not been performed. Then, VM disk 502 is made read/write (instead of read-only), and all subsequent writes and reads are directed to VM disk 502 in a conventional manner. Also, at this point, original VM disk 501 and child VM disk 511 can be deleted.

In one embodiment, the re-parenting and consolidation operations are combined, in which case the consolidation operation identifies the second parent VM disk as one of its parameters.

During consolidation of child VM disk 511 into second parent VM disk 502, VM 200 may or may not be stunned. Because child VM disk 511 may accrue a significant volume of changes before it is consolidated with second parent VM disk 502, it may take a considerable amount of time to perform the consolidation. If consolidation were to be performed with VM 200 stunned, the downtime may be unacceptably long. Thus, it may be desirable to create a second child VM disk that captures changes during the consolidation operation of step 44.

Figure 5B:
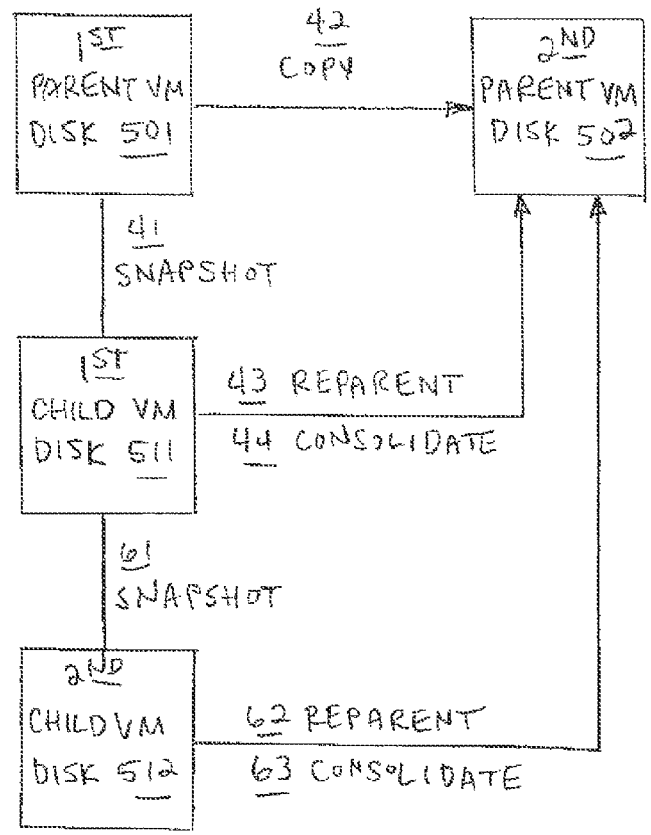

FIG. 5B shows such a use of second child VM disk 512. FIG. 5B is discussed further in conjunction with FIG. 6, which is a flowchart 600 of another embodiment of a method that may be used to relocate a VM disk (e.g., VM disk 501 of FIG. 3) from a first physical storage device (e.g., storage device 351 of FIG. 3) to a second physical storage device (e.g., storage device 352 of FIG. 3).

Figure 6:
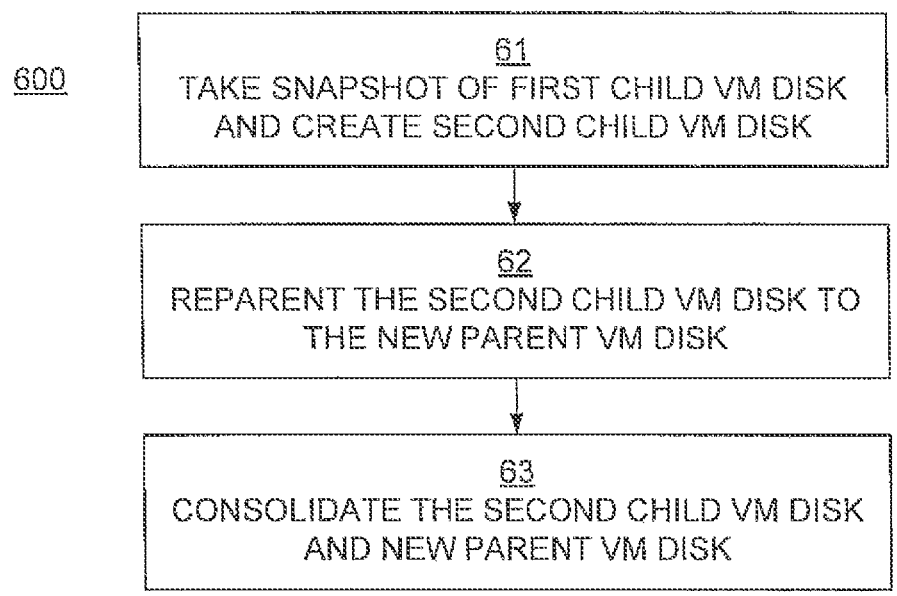
FIG. 6 is a flowchart of a method for relocating a virtual machine disk in accordance with one or more embodiments of the present invention.

At step 61 of FIG. 6, before first child VM disk 501 is consolidated in step 44 of FIG. 4, a snapshot of the contents of first child VM disk 511 is taken—the state of first child VM disk 511 is saved at the instant the snapshot is taken. As mentioned above, VM 200 may or may not be stunned while the snapshot of first child VM disk 511 is made.

As part of the snapshot operation, second child VM disk 512 is created. In accordance with one or more embodiments, second child VM disk 512 initially starts out empty but, as described below, it serves to capture changes (for example, writes) that ordinarily would be directed to first child VM disk 511 or first parent VM disk 501. In accordance with one or more further embodiments, second child VM disk 512 may instead consist of a redo log, may be represented as a file or an RDM, and second child VM disk 512 can be located on any of the storage devices in storage system 300.

In accordance with one or more embodiments, after second child VM disk 512 is created, first child VM disk 511 is made read-only, and all writes intended for first parent VM disk 501 or first child VM disk 511 are redirected to second child VM disk 512. In one embodiment, reads are first directed to second child VM disk 512; if the information sought by a read is not available in second child VM disk 512, then the read is redirected to first child VM disk 511; and if the information sought by the read is not available in first child VM disk 511, then the read is redirected to first parent VM disk 501.

At step 62 of FIG. 6, first child VM disk 511 can be re-parented and consolidated with second parent VM disk 502. Because writes are now being redirected to second child VM disk 512, any changes that would ordinarily be made to VM disk 501 (or first child VM disk 511) are instead captured by second child VM disk 512. Accordingly, it is not necessary to stun VM 200 while first child VM disk 511 is re-parented and consolidated with second parent VM disk 502. After the consolidation, second child VM disk 512 is re-parented to second parent VM disk 502.

At step 63 of FIG. 6, second child VM disk 512 is consolidated with second parent VM disk 502. Specifically, changes written to second child VM disk 512 are incorporated into second parent VM disk 502, and VM disk 502 is made read/write. All subsequent writes and reads are directed to VM disk 502 in a conventional manner, and original VM disk 501 and any child VM disks can be deleted.

Because second child VM disk 512 exists only while first child VM disk 511 is being consolidated, it is expected that consolidation of second child VM disk 512 can be accomplished quickly and without affecting the performance of VM 200. If, however, the volume of changes captured by second child VM disk 512 is significant, another child VM disk can be created as described above. Any number of child VM disks can be created in a hierarchy such that each child becomes the parent of the next child in the hierarchy, with each new parent made read-only. Child VM disks can continue to be created until the volume of changes captured by the last child VM disk is deemed small enough to allow the last child VM disk to be consolidated with second parent VM disk 502 in a sufficiently short amount of time.

To summarize, online VM disk migration works as follows. First, with reference to FIG. 3, the virtualization software determines that it has access to both source and destination storage devices (for example, storage devices 351 and 352, respectively). Then, a snapshot of the VM disk(s) to be relocated is taken, and a child VM disk is created for each parent VM disk. The snapshot operation itself is expected to require little or no downtime for the VM. In general, the snapshot operation should be quick enough not to disrupt network communication with VM 200, or short enough so that any lost or dropped packets can be readily retransmitted. However, to ensure consistency between parent and child VM disks, VM 200 may be stunned for a short period of time.

The parent VM disk is made read-only, and so next, the parent VM disk can be safely copied from the source storage device to the destination storage device, essentially creating a new parent disk. Once the parent VM disk is copied, the child VM disk is re-parented to the new parent VM disk. During re-parenting, VM 200 may or may not be stunned. If stunned, the re-parenting operation is expected to be short enough to require little VM downtime.

After the child VM disk is re-parented, it is consolidated with the new parent VM disk. Again, VM 200 may or may not be stunned and, if stunned, the consolidation operation is expected to be short enough to require little VM downtime. Furthermore, as described above, additional child VM disks can be created until the time needed to consolidate the last child VM disk is sufficiently short. If multiple child VM disks are used in this manner, then VM 200 may be stunned only during consolidation of the last of the child VM disks.

Thus, VM 200 can run with its VM disk(s) in a new location, on a different physical storage device, without significant downtime. Furthermore, online virtual disk migration is implemented in virtualization software, i.e., at a virtualization layer, so its implementation may be transparent to VM 200.

Also, online VM disk migration may be agnostic to the type or version of file system employed by VM 200 or the storage devices, and so migration between different types of file systems is enabled. The ability to use multiple files, raw device mappings, or a combination of both to represent a VM disk is possible due to the layer of redirection introduced by the virtualization layer. Thus, a guest OS running in a VM is unaware of the migration of the VM disks because the redirection is handled transparently. Thus, special software or modifications are not required for the VM. However, in some para-virtualized environments, some modifications to the guest OS may be necessary.

Online VM disk migration is useful in a variety of ways. Administrators can maintain or upgrade physical storage devices without unduly interrupting operation of VMs served by the storage devices. Also, administrators can move VM disks back and forth, on the fly, between storage devices to balance a load across the storage devices.

However, the techniques described herein can be extended beyond migration of VM disks. For example, the techniques described herein can be used for "whole" VM storage migration, from one physical server to another. In many virtualized computer systems, a VM consists of more files than just VM disks. Generally, these files may be a configuration file, log files, a swap file, and other miscellaneous metadata files. These types of files can also be migrated when a VM disk is migrated without significant VM downtime. More specifically, VM disks can be migrated to a new location as described above. Next, the VM's metadata files are copied to a new location (which may or may not be the same as the new location for the VM disks). Then, the VM is moved from its current location to the location of the VM's metadata files (possibly using the current physical host as a destination). One technique for moving a VM is VMotion™ by VMware®. Thus, the destination VM can use the metadata files in the new location. Any changes to the original metadata files can be transferred to the destination VM when the VM is moved, so that the VM will be fully running using the new metadata files and VM disks. Alternately, the VM can be moved before the VM disks are moved.

In accordance with one or more embodiments of the present invention, online VM disk migration and VM migration can be combined to update a virtualization system. When a virtualization system is updated, support for the file system used by the previous version of the virtualization system may be reduced. For example, the older file system may only be supported in read-only mode on the newer virtualization system. Combining online VM disk migration and VM migration allows a VM to be upgraded to the newer version without significant downtime.

More specifically, the VM can be migrated or moved as described above (for example, using VMotion™) so that the VM's metadata files are moved from the old file system to the new file system, while at the same time the VM is migrated to a new location with the newer virtualization system version. Before the VM resumes execution at its destination, the first step of online VM disk migration (step 41 of FIG. 4) is performed, with the constraint that the child VM disk is represented using the new file system. Consequently, when the destination VM resumes execution, its files (for example, child VM disks and metadata files) are on the new file system. At this point, the parent VM disks will still be on the old file system, but they are read-only (as described in conjunction with step 41) and thus this situation is acceptable. The parent VM disks can then be copied to the new file system, after which re-parenting and consolidation are performed (steps 42, 43 and 44 of FIG. 4).

Yet another application for online VM disk migration is in the field of template deployment. Templates are VMs that are created with a specific mix of operating system and software applications. Thus, if a client needs a specific type of VM, the template for that type of VM can be deployed, along with information that individualizes the template for the client—that is, client-specific information such as host name, Internet Protocol (IP) address, and the like are deployed with the VM template. Typically, to deploy a VM template, the VM's entire disk is copied. Because the VM's disk may be very large, deployment can take some time.

By combining online VM disk migration with template deployment, the speed at which templates are deployed can be increased. During deployment, metadata files are copied initially, but instead of immediately copying the template's VM disk, the VM disk is migrated to its destination. As part of the VM disk migration, a child VM disk is created, into which the client-specific information is written. In this manner, the original template VM disk is not affected by the deployment; all writes to the new VM are directed to the child VM disk. Because the snapshot operation can be accomplished quickly, the new template VM can be up and running quickly as well. The template VM can then be individualized by consolidating the client-specific child VM disk into the template.

In summary, methods and systems for online virtual machine disk migration are disclosed. Online virtual disk migration allows VM disks to be safely and correctly relocated to different physical storage devices while the VM is running. The relocation is transparent to the guest OS and applications running in the VM as well as to clients connected to the VM through network connections. While there may be some VM downtime, these periods are expected to be negligible. Because the VM disks can be relocated while the VM is running with very little downtime, the performance of the VM is not significantly impacted during the online migration operation. Also, online virtual machine disk migration is agnostic to the type or version of file system and storage device on which the VM's disks reside, and so migration between different file system or storage device types is allowed.

Furthermore, in comparison to storage replication or mirroring technologies, which generally replicate at the granularity of a storage device, online virtual machine disk migration is more granular, giving users control over each VM. Finally, online virtual machine disk migration can be advantageously combined with applications such as VM motion and VM templates.

Embodiments of the present invention have been described herein by way of non-limiting examples in conjunction with the accompanying drawings. The particulars shown are by way of example and for purposes of illustrative discussion of the various embodiments of the present invention only. It is to be understood that embodiments of the present invention are not limited in their application to details of construction and arrangements of components set forth in the description or illustrated in the drawings. Further embodiments of the present invention are capable of being fabricated or of being practiced or carried out in various ways. Also, the phraseology and terminology employed herein are for the purpose of description and should not be regarded as limiting.

It is appreciated that certain features of one or more embodiments of the present invention, which are, for the sake of clarity, described in the context of separate embodiments, may also be provided in combination in a single embodiment. Conversely, various features of one or more embodiments of the present invention, which are, for brevity, described in the context of a single embodiment, may also be provided separately or in any suitable sub-combination.

Embodiments of the present invention may be implemented in a variety of virtual computer systems, based on a variety of different physical computer systems. An embodiment of the invention is described in connection with a specific virtual computer system simply as an example of implementing the invention. The scope of the invention should not be limited to, or by, the exemplary implementation. Further, an embodiment of this invention may be implemented in hardware, that is, a non-virtualized system, for example, a CPU.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

Lastly, unless specifically stated otherwise as apparent from the discussion above, terms such as "creating," "directing," "redirecting," "producing," "consolidating," "designating," "quiescing," "changing," "migrating," "duplicating," "copying," "checking," "linking," "incorporating," "snapshotting" or the like, refer to actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

In the foregoing specification, embodiments have been described with reference to numerous specific details that may vary from implementation to implementation. However, no limitation, element, property, feature, advantage, or attribute that is not expressly recited in a claim should limit the scope of such claim in any way. Accordingly, the specification and drawings are to be regarded in an illustrative rather than a restrictive sense.

Appendix

Figure 1:
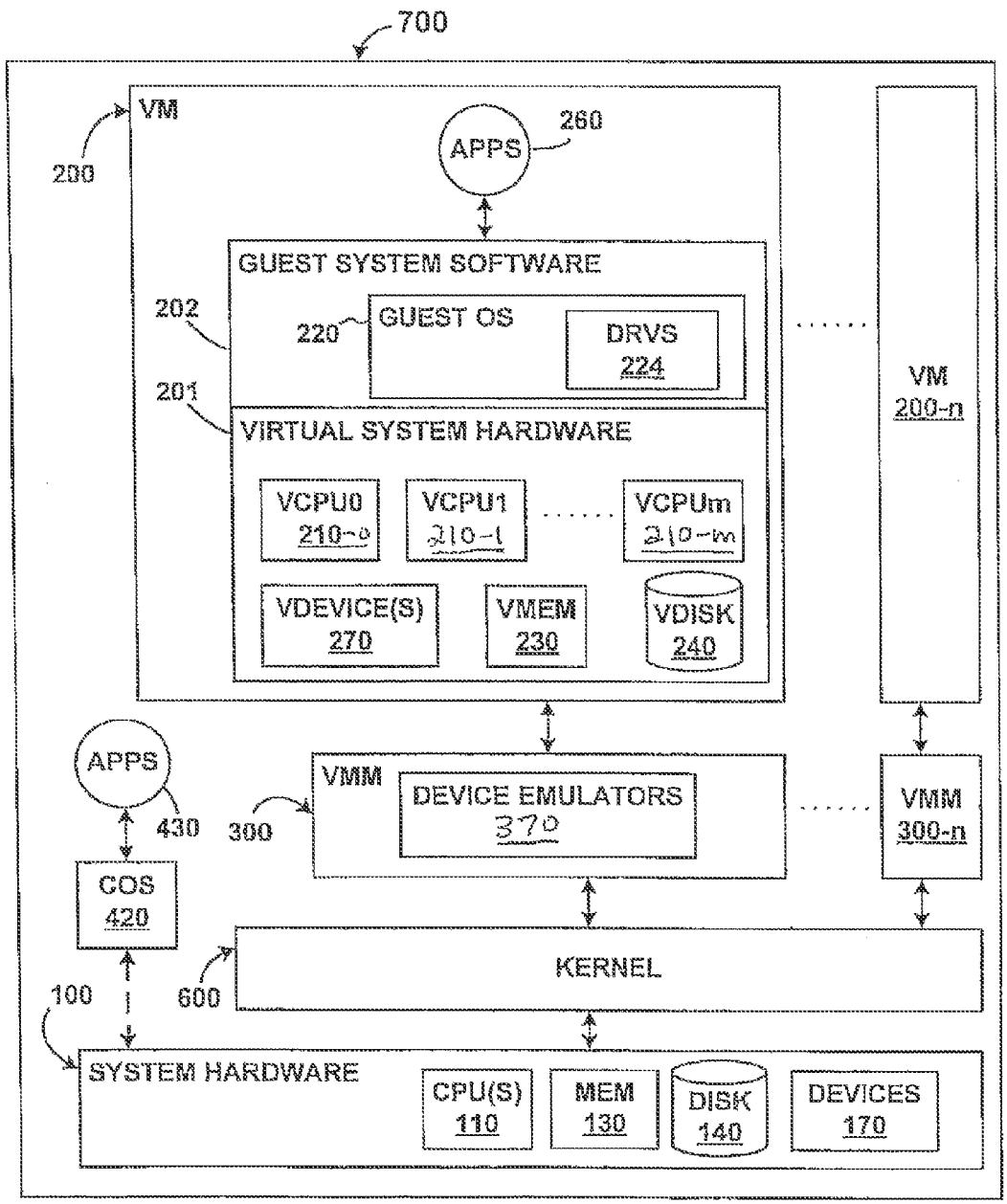
FIG. 1 is a block diagram of a computer system that implements non-hosted virtualization.

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, each virtual machine (VM) or "guest" 200, . . . , 200-n is installed on a "host platform," or simply "host," which includes system hardware 100, that is, a hardware platform, and one or more layers or co-resident components comprising system-level software, such as an operating system (OS) or similar kernel, or a virtual machine monitor, or a hypervisor (see below), or some combination of these, or a similar software layer responsible for coordinating and mediating access to hardware resources.

As software, code defining the VM will ultimately execute on the actual system hardware 100 which typically includes one or more processors (CPUs) 110, some form of memory 130 (volatile and/or non-volatile), one or more storage devices such as one or more disks 140, and one or more other devices 170 which may be integral or separate and removable. In many existing virtualized systems, hardware processor(s) 110 are the same as in a non-virtualized computer with the same platform, for example, an Intel x-86 platform. Because of the advantages of virtualization, however, some hardware processors have also been developed to include specific hardware support for virtualization.

Each VM 200 (including VM 200 and additional "n" number of VMs 200-n) will typically have both virtual system hardware 201 and guest system software 202. The virtual system hardware typically includes at least one virtual CPU (for example, VCPU0 210-0-VCPUm-210-m), virtual memory (VMEM) 230, at least one virtual disk (VDISK) 240 or similar virtualized mass storage device, and one or more virtual devices (VDEVICE(S)) 270. Note that a disk—virtual or physical—is also a "device," but is usually considered separately because of the important role it plays. A virtual disk is a file or set of files that appears as a physical disk drive to a guest operating system. These files can be on the host machine or on a remote file system. All of the virtual hardware components of a VM may be implemented in software using known techniques to emulate corresponding physical components. The guest system software includes guest operating system (OS) 220 and drivers (DRVS) 224 as needed for example, for the various virtual devices 270.

A single VM may be configured with more than one virtualized processor. To permit computer systems to scale to larger numbers of concurrent threads, systems with multiple CPUs—physical or logical, or a combination—have been developed. One example is a symmetric multi-processor (SMP) system, which is available as an extension of the PC platform and from multiple vendors. Another example is found in a so-called "multi-core" architecture, in which more than one physical CPU is fabricated on a single chip, with its own set of functional units (such as a floating-point unit and an arithmetic/logic unit ALU), and which can execute threads independently from one another. Still another technique that provides for simultaneous execution of multiple threads is referred to as "simultaneous multi-threading," in which more than one logical CPU (hardware thread) operates simultaneously on a single chip, but in which logical CPUs flexibly share not only one or more caches, but also some functional unit(s) and sometimes also a translation lookaside buffer (TLB).

Similarly, a single VM may (but need not) be configured with more than one virtualized physical and/or logical processor; FIG. 1 illustrates multiple virtual processors VCPU0 210-0, VCPU1 210-1, . . . , VCPUm 210-m) within VM 200. Each virtualized processor in a VM may also be multi-core, or multi-threaded, or both, depending on the virtualization. One or more embodiments of the present invention may be used regardless of the type—physical and/or logical—or number of processors included in a VM.

As is well known, "virtualization software" interfaces between guest software within a VM and various hardware components and devices in the underlying hardware platform. This interface—which may be referred to generally as "virtualization software" or a "virtualization layer"—may include one or more software components and/or layers, possibly including one or more of the software components known in the field of virtual machine technology as a "virtual machine monitor" (VMMs 300, . . . , 300-n), "hypervisors," or virtualization "kernels" 600. Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs (300-300-n) incorporated wholly or partially into the kernel itself; however, the term "hypervisor" is sometimes, however, used instead to mean some variant of a VMM alone, which interfaces with some other software layer(s) or component(s) to support the virtualization. Moreover, in some systems, virtualization code is included in at least one "superior" VM to facilitate the operations of other VMs. Furthermore, specific software support for VMs is sometimes included in the host OS itself. Unless otherwise indicated, one or more embodiments of the present invention may be used in virtualized computer systems having any type or configuration of virtualization software.

Figure 2:
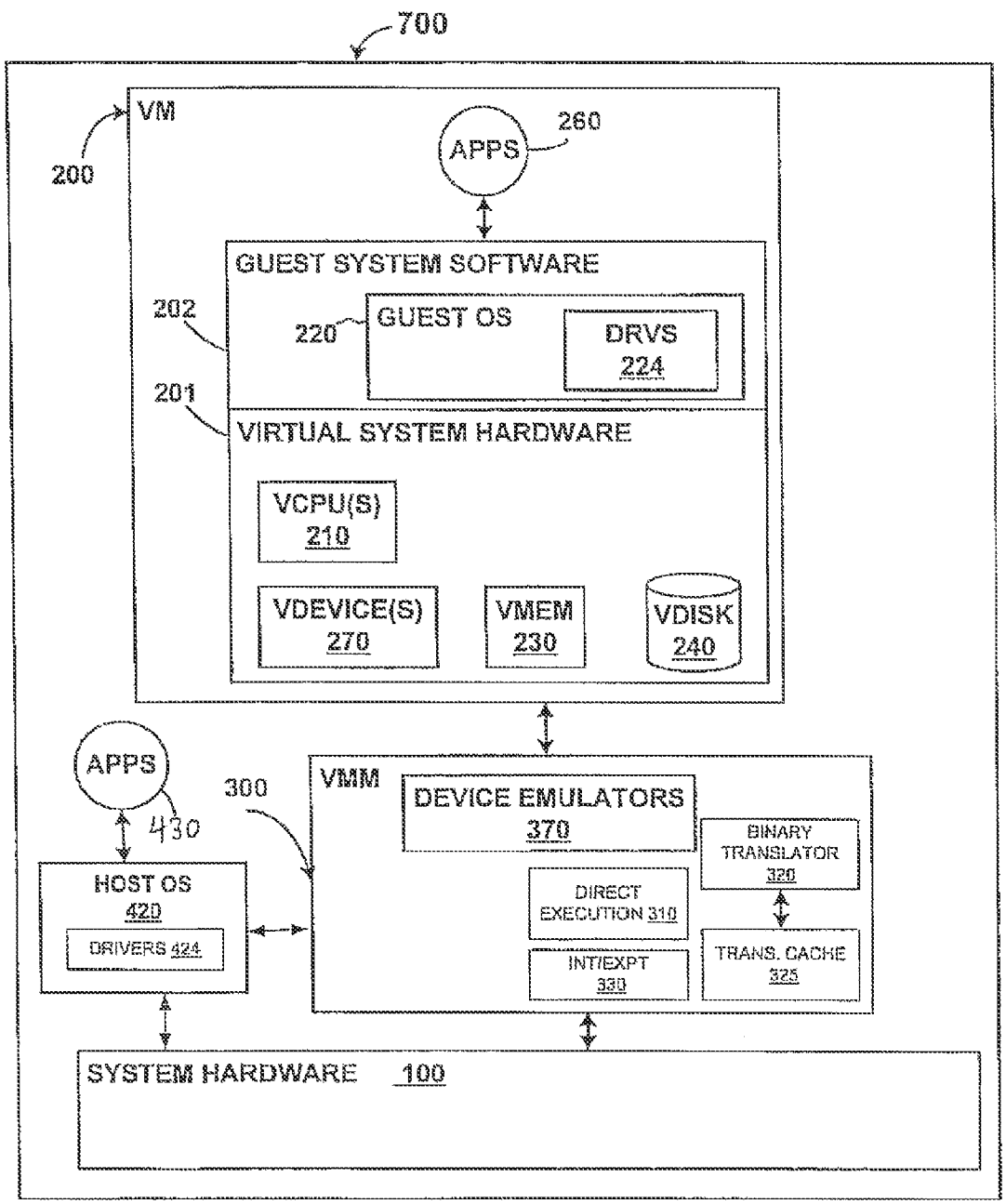
FIG. 2 is a block diagram of a computer system that implements hosted virtualization.

By way of illustration and example only, FIGS. 1 and 2 show each VM running on, or with, a corresponding virtual machine monitor. The description's reference to VMMs is also merely by way of common example. A VMM is usually a software component that virtualizes at least one hardware resource of some physical platform so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in a VM, such as virtual CPU(s) 210-0, . . . , 210-m, virtual memory 230, virtual disk 240, and virtual device(s) 270, are shown as being part of VM 200 for the sake of conceptual simplicity. In actuality, these "components" are often implemented as software emulations (for example, device emulators 370) included in some part of the virtualization software, such as the VMM.

FIGS. 1 and 2 show VMMs that appear as separate entities from other components of virtualization software. Furthermore, some software components used to implement one illustrated embodiment of the present invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Again, unless otherwise indicated or apparent from the description below, it is to be assumed that one or more embodiments of the present invention can be implemented anywhere within the overall structure of the virtualization software, and even in systems that provide specific hardware support for virtualization.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of a virtualization software component such as VMM 300. Host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM of a virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

As illustrated in FIG. 1, in many cases, it may be beneficial to deploy VMMs on top of a software layer—kernel 600—constructed specifically to provide efficient support for the VMs. This configuration is frequently referred to as being "non-hosted." Compared to a system in which VMMs (or other software components or layers with similar functionality) run directly on the hardware platform (such as shown in FIG. 2), use of a kernel offers greater modularity and facilitates provision of services (for example, resource management) that extend across multiple virtual machines. Further, a kernel may offer greater performance because it can be co-developed with the VMM and be optimized for the characteristics of a workload consisting primarily of VMs/VMMs as compared to a hosted deployment. Kernel 600 also handles any other applications running on it that can be separately scheduled, as well as a temporary "console" operating system 420 that, in some systems, is included for such operations as booting the system as a whole or enabling certain user interactions with the kernel. Note that kernel 600 is not the same as the kernel that will be within the guest OS 220. Note also that kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization. The console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

At least some virtualization technology provides that: (a) each VM 200, . . . , 200n has its own state and is an entity that can operate independently of other VMs; (b) the user of a VM, that is, a user of an application running on the VM, will usually not be able to notice that the application is running on a VM (which is implemented wholly as software) as opposed to a "real" computer; (c) assuming that different VMs have the same configuration and state, the user will not know, and would have no reason to care, which VM he is currently using as long as performance is acceptable; (d) the entire state (including memory) of any VM is available to its respective VMM, and the entire state of any VM and of any VMM is available to kernel 600; and (e) as a consequence of the foregoing, a VM is "relocatable."

As shown in FIG. 1, the multi-VM system can be implemented in a single physical machine 700, such as a server. Typically, devices such as keyboards, monitors, etc., will also be included to enable users to access and use the system via a network of any known type; these are not shown for the sake of simplicity.

In systems configured as in FIG. 1, the resources of a single physical machine are managed. Virtual machines are installed on the hardware platform and the CPU(s), network, memory, and disk resources for that machine are managed by kernel 600 or similar server software. To balance computing resources, some systems implement a "migration" of a running virtual machine (VM) from one system to another.

What is claimed is:

1. A method for migrating a virtual disk from first physical storage to second physical storage while an application execution environment depending on the virtual disk for execution is maintained in its physical location, the method comprising:
    creating a first child virtual disk to which writes are redirected from a first parent virtual disk, the first parent virtual disk being on the first physical storage, wherein an application execution environment is dependent on the first parent virtual disk for execution;
    copying the first parent virtual disk to the second physical storage as a second parent virtual disk while the application execution environment is running;
    re-parenting the first virtual child disk to the second parent virtual disk; and
    consolidating the first child virtual disk and the second parent virtual disk on the second physical storage;
    wherein the first parent virtual disk is migrated from the first physical storage to the second physical storage without migrating the application execution environment.

2. The method of claim 1 further comprising stunning the application execution environment during the consolidating, such that writes to the first child virtual disk or the second parent virtual disk are not occurring during the consolidating.

3. The method of claim 1 further comprising deleting the first parent virtual disk from the first physical storage without migrating the application execution environment, such that the application execution environment has remained in its physical location while the first parent virtual disk on which the application execution environment is dependent for execution has been migrated.

4. The method of claim 1 wherein the physical storage on which the first child virtual disk is created is the first physical storage or the second physical storage or another physical storage.

5. The method of claim 1 further comprising, after the first child virtual disk is created:
    designating the first parent virtual disk as read-only; and
    redirecting writes intended for the first parent virtual disk to the first child virtual disk.

6. The method of claim 1 further comprising, prior to consolidating:
    directing a read intended for the first parent virtual disk to the first child virtual disk if information associated with the read is unavailable in the first parent virtual disk.

7. The method of claim 1 wherein the first child virtual disk is represented as a file or as a raw device mapping.

8. The method of claim 1 wherein the first parent virtual disk is represented as a file or as a raw device mapping.

9. The method of claim 1 further comprising:
    taking a snapshot of the first child virtual disk, whereby a second child virtual disk is created on physical storage;
    redirecting writes intended for the first child virtual disk to the second child virtual disk; and
    subsequent to consolidating the first child virtual disk and the second parent virtual disk, consolidating the second child virtual disk and the second parent virtual disk.

10. The method of claim 9 further comprising, prior to consolidating:
    directing a read intended for the first parent virtual disk to the first child virtual disk if information associated with the read is unavailable in the first parent virtual disk; and
    directing the read to the second child virtual disk if the information is unavailable in the first child virtual disk.

11. The method of claim 1 further comprising migrating the application execution environment from a first host platform to a second host platform.

12. A non-transitory computer-readable medium having computer-executable instructions for causing a virtualized computer system to perform a method migrating a virtual disk from first physical storage to second physical storage while an application execution environment depending on the virtual disk for execution is maintained in its physical location, the method comprising:
    creating a first child virtual disk to which writes are redirected from a first parent virtual disk, the first parent virtual disk being on the first physical storage, wherein an application execution environment is dependent on the first parent virtual disk for execution;
    copying the first parent virtual disk to the second physical storage as a second parent virtual disk while the application execution environment is running;
    re-parenting the first virtual child disk to the second parent virtual disk; and
    consolidating the first child virtual disk and the second parent virtual disk on the second physical storage;
    wherein the first parent virtual disk is migrated from the first physical storage to the second physical storage without migrating the application execution environment.

13. The computer-readable medium of claim 12 wherein the method further comprises stunning the application execution environment during the consolidating, such that writes to the first child virtual disk or the second parent virtual disk are not occurring during the consolidating.

14. The computer-readable medium of claim 12 further comprises deleting the first parent virtual disk from the first physical storage without migrating the application execution environment such that the application execution environment has remained in its physical location while the first parent virtual disk on which the application execution environment is dependent for execution has been migrated.

15. The computer-readable medium of claim 12 wherein the method further comprises, after the first child virtual disk is created:
   designating the first parent virtual disk as read-only; and
   redirecting writes intended for the first parent virtual disk to the first child virtual disk.

16. The computer-readable medium of claim 12 wherein the method further comprises, prior to consolidating:
   directing a read intended for the first parent virtual disk to the first child virtual disk if information associated with the read is unavailable in the first parent virtual disk.

17. The computer-readable medium of claim 12 wherein the first child virtual disk is represented as a file or as a raw device mapping.

18. The computer-readable medium of claim 12 wherein the first parent virtual disk is represented as a file or as a raw device mapping.

19. The computer-readable medium of claim 12 wherein the method further comprises:
   taking a snapshot of the first child virtual disk, whereby a second child virtual disk is created on physical storage;
   redirecting writes intended for the first child virtual disk to the second child virtual disk; and
   subsequent to consolidating the first child virtual disk and the second parent virtual disk, consolidating the second child virtual disk and the second parent virtual disk.

* * * * *